G. H. HOUCK.
BICYCLE HANDLE BAR.
APPLICATION FILED APR. 11, 1908.
918,856.
Patented Apr. 20, 1909.
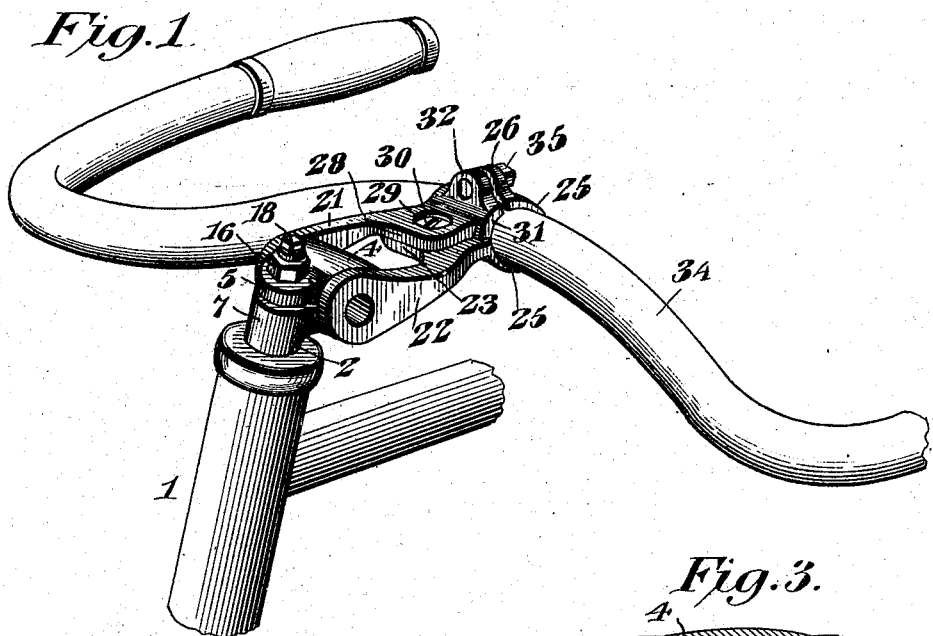
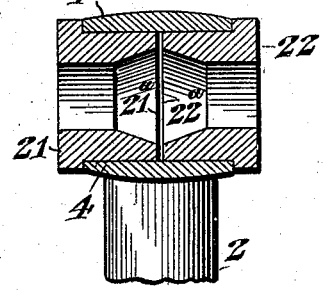
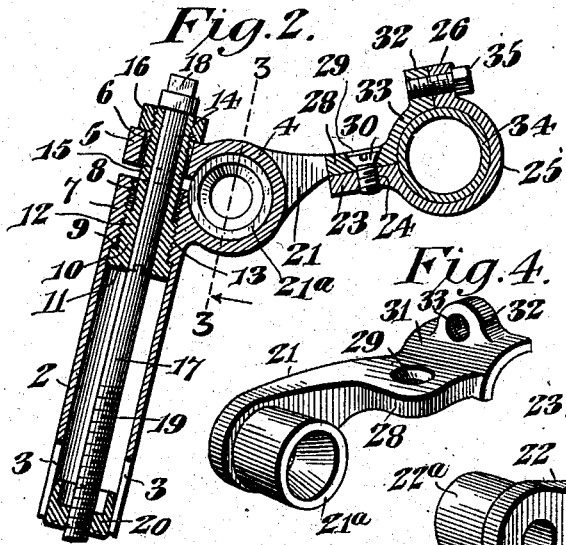
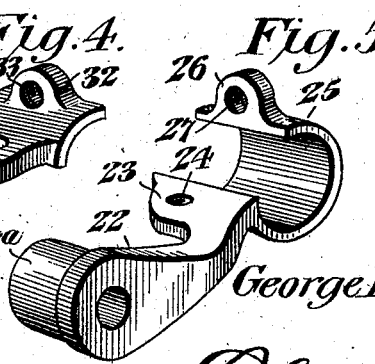
George H. Houck,
Inventor
Witnesses

UNITED STATES PATENT OFFICE.

GEORGE H. HOUCK, OF TONAWANDA, NEW YORK.

BICYCLE HANDLE-BAR.

No. 918,856.

Specification of Letters Patent.

Patented April 20, 1909.

Application filed April 11, 1908. Serial No. 426,582.

*To all whom it may concern:*

Be it known that I, GEORGE H. HOUCK, a citizen of the United States, residing at Tonawanda, in the county of Erie and State of New York, have invented a new and useful Bicycle Handle-Bar, of which the following is a specification.

This invention relates to an improved adjustable extension support for bicycle handle-bars, and has for its object to provide a simple, novel and effective clamping device by means of which the handle-bar may be quickly raised or lowered as desired by the rider, and securely retained in any adjusted position.

A further object of the invention is to provide a support having means whereby the handle-bar may be readily detached from or attached to the stem of a bicycle head.

In the drawings:—Figure 1 is a perspective view of the support, showing the same applied to the head of a bicycle. Fig. 2 is a vertical sectional view of the invention, with the parts removed from the head. Fig. 3 is a detail vertical sectional view taken on the line 3—3 of Fig. 2. Fig. 4 is a perspective view of one of the handle clamping members. Fig. 5 is a perspective view of the other clamping member.

Similar reference numerals designate corresponding parts in all the figures of the drawings.

Referring to the drawings, 1 designates the head of a bicycle which is provided with a tubular stem 2 that is adapted to enter the steering fork tube. The lower end of the stem is provided with a plurality of longitudinal slots 3 of a sufficient length for the purpose hereinafter explained. The upper end of the stem forms a rearwardly extending resilient clamping member 4, which terminates in an ear 5 that is spaced from the body portion of the stem, and is provided with a smooth bore or opening 6 that is in alinement with the bore of the stem 2. The upper part 7 of the body portion of the stem is of greater thickness in cross section than the lower part, and is interiorly threaded as shown in Fig. 2 by the numeral 8, the bottom of said threaded portion forming a shoulder 9. A hollow clamping bolt 10, having a head 11 and a shank 12, that is provided with threaded portions 13 and 14 respectively, which are spaced apart by a smooth portion 15, is screwed into the threaded portion 8 of the stem 2. The upper end of said bolt passes through and beyond the bore 6 of the ear 5, and is provided with a nut 16, which is adapted to bear against the top surface of the ear 5 and thereby force the said ear downwardly toward the body portion of the stem. A bolt 17, having a squared head 18 and a threaded shank 19 passes through the hollow bolt 10, and the stem 2, and terminates a short distance below the bottom of said stem. The bolt 17 is screwed into a hollow tapered nut 20 that is adapted to be brought inside and bear against the wall of the stem and thereby expand the same. The features thus far described constitute no part of my invention, except as they enter into and form elements of the combination of parts to which I lay claim.

The handle bar is retained in its desired position by means of an adjustable clamp constituting a support, which clamp comprises two rearwardly tapered arms 21 and 22, each having an integral and hollow inwardly extending gudgeon $21^a$ and $22^a$ respectively, as clearly illustrated in Figs. 4 and 5 of the drawings. These gudgeons are adapted to enter the opposite ends of the rearwardly extending clamping member 4 and to be clamped therein by means of the nut 16. The opposite end of the arm 22 forms an inwardly extending flat bearing 23 having a threaded opening 24, and an upturned resilient clamping member 25 which is provided at its extreme end with a substantially vertical ear 26 having a threaded opening 27 therein. The corresponding end of the other arm 21 forms an inwardly extending flat bearing 28 having an opening 29 therein. This bearing is adapted to rest upon the bearing surface 23 of the other arm in such a manner that the two openings 29 and 24 respectively register. These two arms are held in this relation by a set screw 30 which passes through the opening 29 and into the threaded opening 24. The bearing 28 of the arm 21 terminates in an upturned clamping member 31 of sufficient length to fit between the bearing 23 and the ear 26, and is provided with a substantially vertical ear 32 having a threaded opening 33 that is adapted to register with the corresponding opening 27 of the ear 26. The handle bar 34 is positioned between the two clamping members 25 and 31, and is adapted to be retained at any angle by means of a screw 35 which is threaded into the two registering openings 27 and 33, thereby clamping the two members securely to said handle bar.

From the foregoing description, it will be readily observed that by loosening the clamping member 4, the handle bar can be quickly arranged at different elevations, and then secured at any position desired by the rider. Furthermore, the handle bar can be quickly arranged at any suitable angle as desired. It will be noted that the screw 35 of the handle bar clamp, not only serves to secure the handle bar, but prevents any tendency of the two gudgeons from becoming unseated from the resilient clamping member 4.

Having thus fully described my invention, what I claim as new, and desire to secure by Letters Patent, is:—

1. A handle bar support comprising a tubular stem, the top end thereof forming a rearwardly extending resilient loop, that is provided with an ear having an opening in register with the stem, a hollow clamping bolt screwed into the upper part of the stem and extending through and above the ear of the loop and provided with a nut, a support comprising arms that are provided with gudgeons adapted to enter the resilient loop and to be clamped thereto, means for securing the arms together, and a clamp formed by the opposite ends of the arms and adapted to grip the handle bar and prevent any movement thereof.

2. In a handle bar support, the combination with a stem having a clamping member, of an extension support comprising two arms, a gudgeon provided on one end of each arm, said gudgeons being secured to the clamping member, registering openings provided in the arms at an intermediate point, a fastening screw passed through the openings for holding the arms together, a sectional clamp formed by the opposite ends of the arms and adapted to embrace the handle bar, and a set screw for securing the sections of the clamp to the handle bar and also serving to prevent any outward movement of the arms.

3. In a handle bar support, the clamp consisting of two arms, each having a gudgeon at one end, the intermediate portions of the arms overlapping and provided with registering openings, a set screw passed through the openings, the other ends of the arms each carrying a section of a clamp for the handle bar, and a screw for securing the sections of the clamp together.

4. In a handle bar support, the combination of the bicycle head having the rearwardly extending resilient loop, means for expanding and contracting said loop, a clamp constituting an extension support for the handle bar and consisting of two arms, the front ends of which each having a gudgeon to fit in said loop, and a sectional clamp provided at the other ends of said arms to embrace and grip the handle bar, each arm carrying a section of the clamp.

In testimony that I claim the foregoing as my own, I have hereto affixed my signature in the presence of two witnesses.

GEORGE H. HOUCK.

Witnesses:
RAY M. STANLEY,
HARRIETT B. LUTHER.